Aug. 22, 1933.   N. A. KARLIN   1,923,575
CHANGEABLE DISPLAY DEVICE
Filed Dec. 5, 1931    5 Sheets-Sheet 1
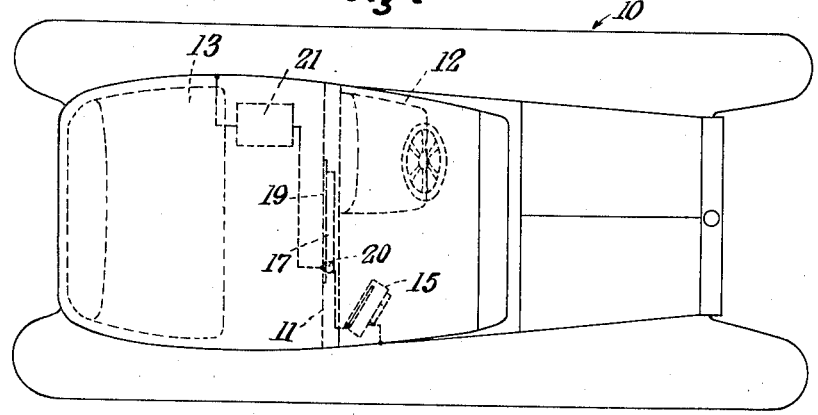
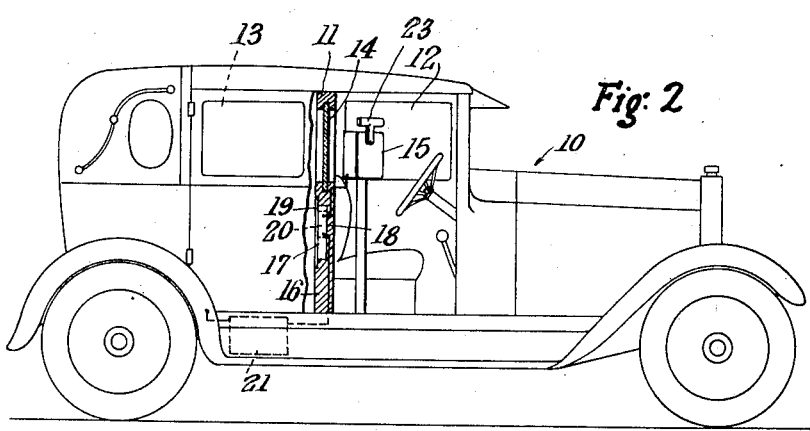
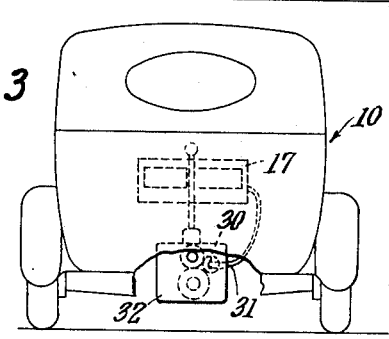
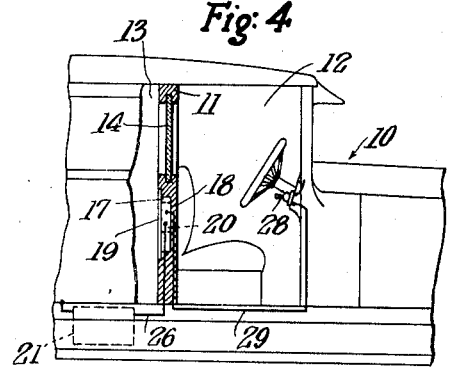
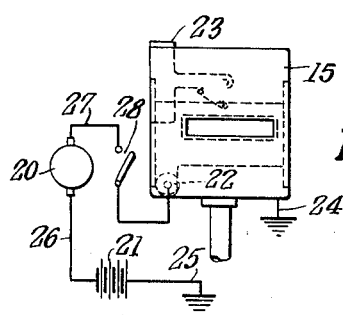
INVENTOR
*Nathan A. Karlin*
BY *Harry Jacobson*
ATTORNEY Aug. 22, 1933.      N. A. KARLIN      1,923,575
CHANGEABLE DISPLAY DEVICE
Filed Dec. 5, 1931     5 Sheets-Sheet 2
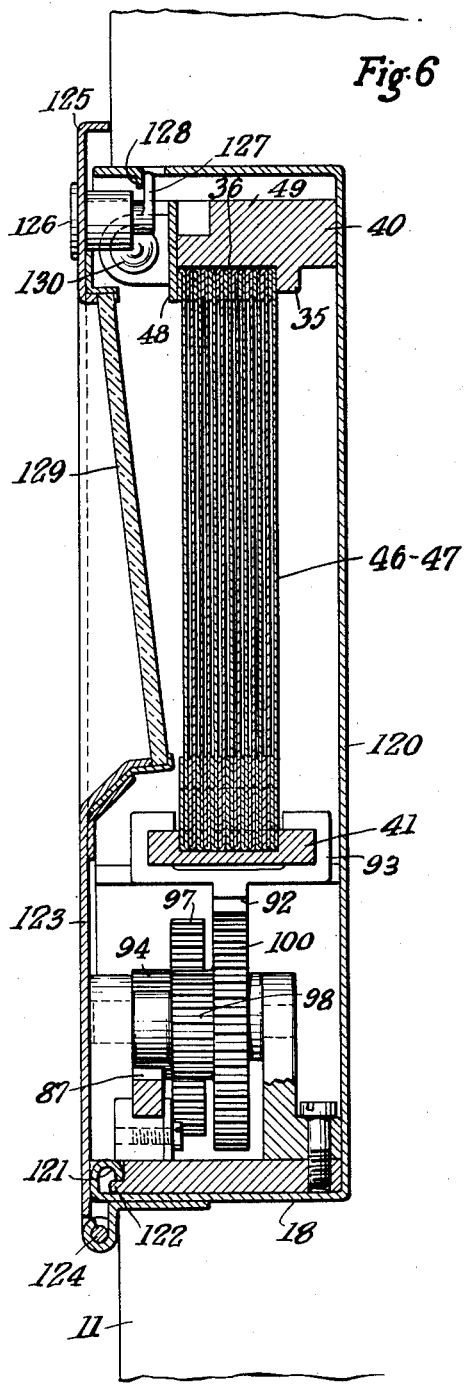
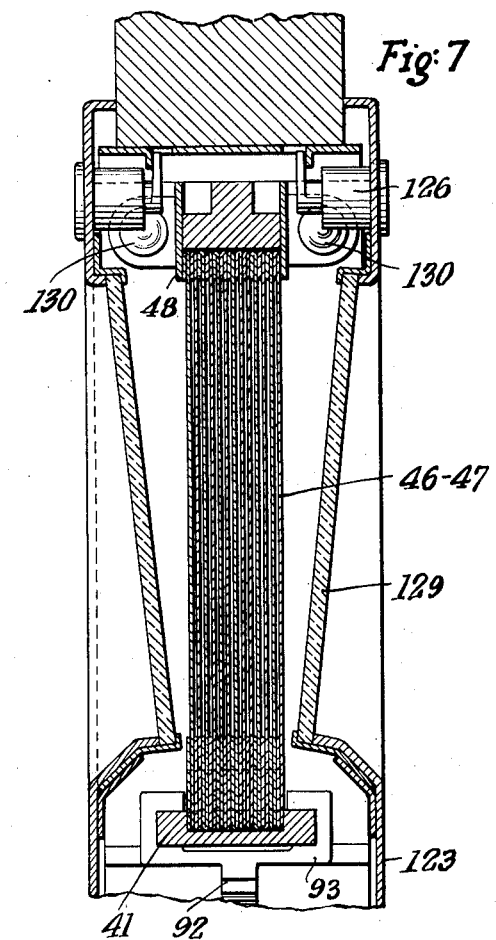
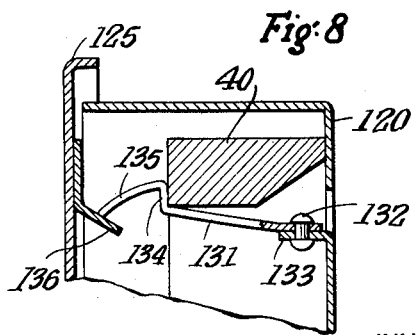
INVENTOR
Nathan A. Karlin
BY Harry Jacobson
ATTORNEY

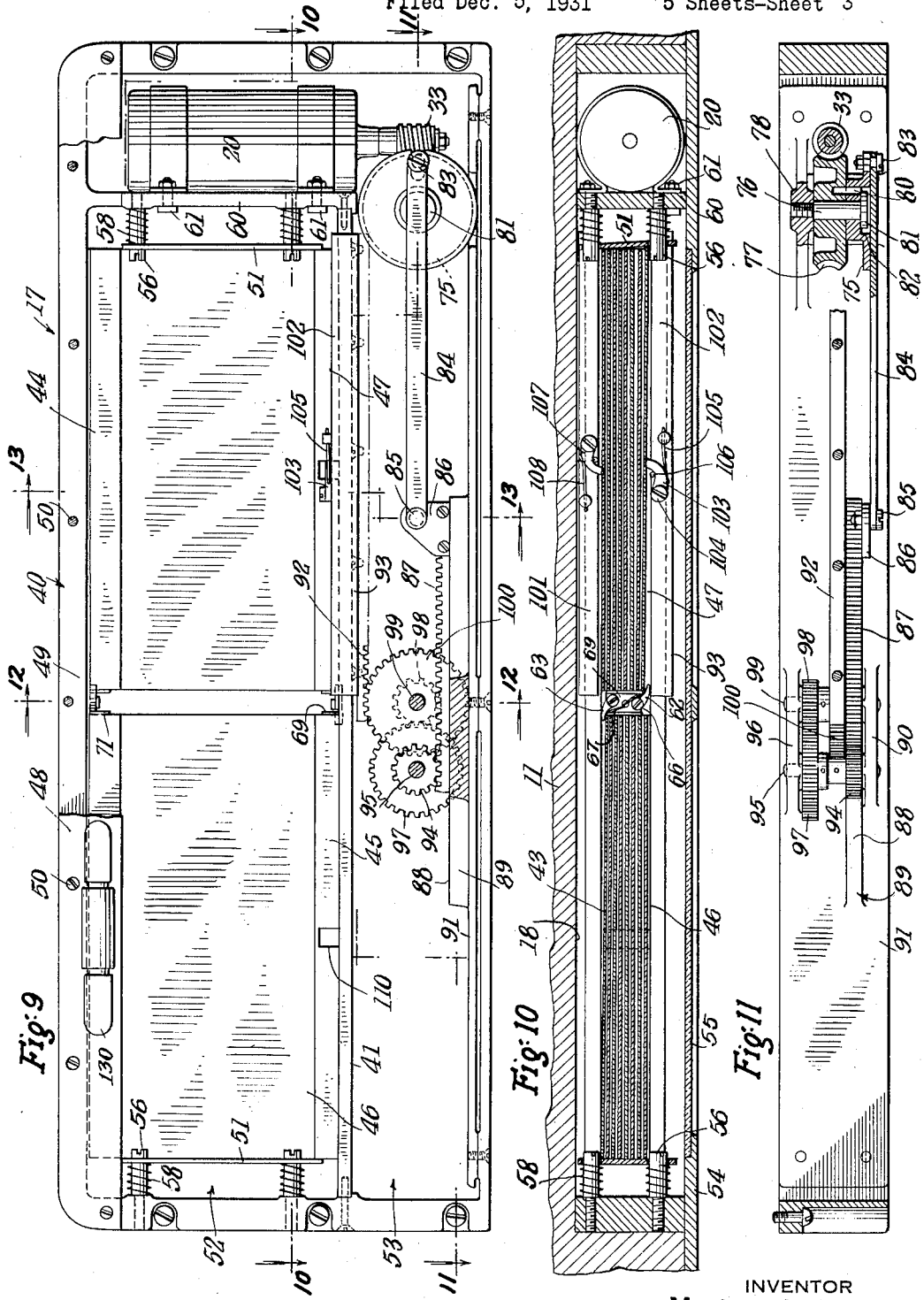

Aug. 22, 1933.   N. A. KARLIN   1,923,575
CHANGEABLE DISPLAY DEVICE
Filed Dec. 5, 1931   5 Sheets-Sheet 4

INVENTOR
Nathan A. Karlin
BY
Harry Jacobson
ATTORNEY

Aug. 22, 1933.    N. A. KARLIN    1,923,575
CHANGEABLE DISPLAY DEVICE
Filed Dec. 5, 1931    5 Sheets-Sheet 5
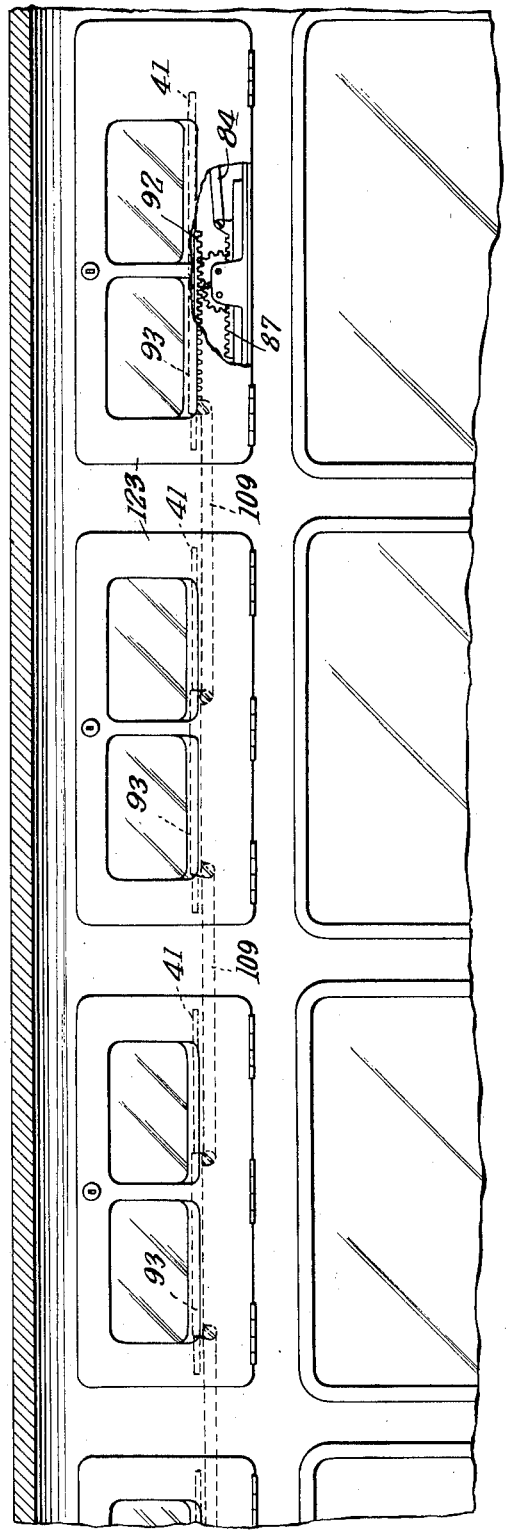
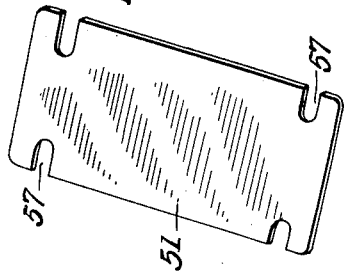
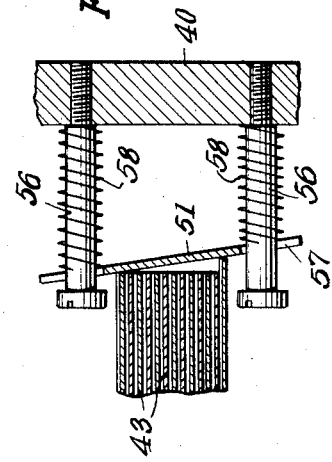
INVENTOR
*Nathan A. Karlin*
BY
ATTORNEY Patented Aug. 22, 1933

1,923,575

UNITED STATES PATENT OFFICE 1,923,575

CHANGEABLE DISPLAY DEVICE

Nathan A. Karlin, Brooklyn, N. Y., assignor to Cabad Corporation of America, a Corporation of New York Application December 5, 1931
Serial No. 579,143

25 Claims. (Cl. 40—36)

This invention relates to changeable display devices and particularly, to devices for automatically and successively selecting one or more display plates, which are reciprocated into display position from a series of such plates.

My invention is particularly applicable for use in railway and highway vehicles, but will be described hereinafter with particular reference to taxicabs, wherein the amount of available electrical power and the space available for advertising and display purposes are limited. My invention, however, has numerous other uses, as will be obvious, such as for example, to announce theatre programs, for advertising in show windows, for station indicators, and the like.

My invention contemplates the provision of simple, compact, positively acting and efficient means for transferring one or more selected plates from a number of sets of such plates, into position wherein the selected plates are displayed for a predetermined time, the front plate of one set being removed to the front of the adjacent set, and the rear plate of said adjacent set moved to the rear of the first set repeatedly and successively.

My invention further contemplates the provision of means for insuring that the visible plates are properly aligned and held in display position for the desired time and that the remaining plates are properly arranged to be advanced into display position, while eliminating the necessity for the use of any mechanism to advance the plates laterally, the plates being so constructed and arranged that they are mutually supported and self-held and advanced under the spring-like action thereof.

My invention further contemplates the provision of means controlled by the driver of a taxicab for automatically setting the device into operation when the cab is hired and occupied by a passenger, or when the device is used as a station indicator on railway vehicles, my invention contemplates the provision of means for operating the device through a single cycle of operations, and adapted to be tripped or set into operation by suitable tripping means located in the path of the vehicle, said means including a one-revolution clutch.

My invention also contemplates the provision of an operating unit readily removable from and insertable into its casing with ease and rapidity when desired. My invention further contemplates the provision of means whereby any desired number of aligned plates may be displayed and operated by a single driving unit.

The various objects of my invention will be clear from the description which follows, and from the drawings, in which, Fig. 1 is a top plan view of a vehicle such as a taxicab, showing the arrangement of my improved advertising device therein, and one form of the electrical connections thereto.

Fig. 2 is a side elevation, partly in section, of the same.

Fig. 3 is a rear view of the same, showing a mechanical means for supplying power to the device.

Fig. 4 is a partial elevation and partial vertical section of a portion of the same, showing a modified form of the electrical control means for my improved device.

Fig. 5 is an electrical diagram of a modified arrangement of the connections to my improved device.

Fig. 6 is a vertical section of a preferred form of my new display device, showing its arrangement in a wall or partition.

Fig. 7 is a similar section of a modified form of the same wherein two sets of plates are simultaneously exposed to view on opposite sides.

Fig. 8 is a vertical section of the upper part of the casing shown in Fig. 6, illustrating the means for preventing vibration and consequent loosening of the parts.

Fig. 9 is an elevational view of a somewhat modified form of my improved operating unit, the front plate and outer frame having been removed.

Fig. 10 is a horizontal section of the same, taken on the line 10—10 of Fig. 9.

Fig. 11 is a similar section, taken on the line 11—11 of Fig. 9.

Fig. 14 is an elevation and partial section of a part of a vehicle showing the tandem arrangement of the display devices when a plurality of such devices are to be operated from a single drive mechanism.

Fig. 15 is a top plan view and partial horizontal section of the buffer device for aiding the proper alignment and positioning of the transferred plates, and Fig. 16 is a perspective view of a buffer plate.

Figure 12:
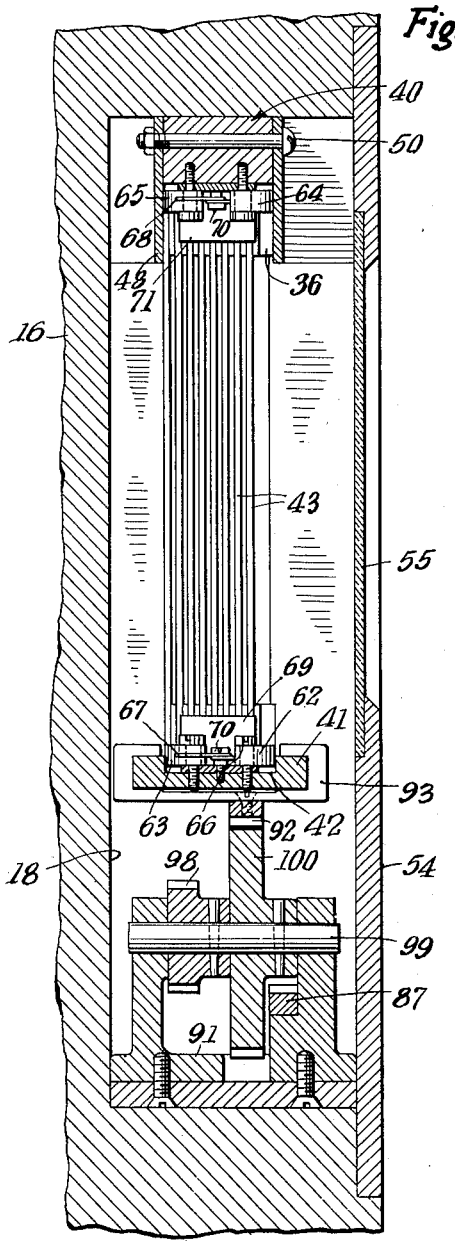
Fig. 12 is a vertical cross-section of the same, taken on the line 12—12 of Fig. 9.

In that practical embodiment of my invention which I have illustrated by way of example, and which is not to be construed as limiting my device to the specific support or vehicle shown, I have illustrated the device applied to a taxicab 10.

Such taxicabs are usually provided with a partition or wall 11, between the driver's compartment 12 and the passenger compartment 13. Said partition is also usually provided with a glass panel 14 whereby the passenger may observe the taximeter 15. Part of the remainder 16 of the partition is customarily used for the display of the driver's picture, his license, and other matter, as required by law in certain States. I prefer, therefore, to use the opaque portion 16 of the partition for the mounting of my new advertising device which is designated generally by the numeral 17. Said portion 16, whether hollow or solid, may be provided with a suitable recess as 18, preferably arranged centrally between the side walls of the vehicle (Fig. 3), and into which the advertising device 17 is wholly or partly set so that the front face 19 of the device becomes substantially flush with the rear face of the partition portion 16, whereby the passenger compartment 13 remains substantially unobstructed by any projecting parts of the device.

As is illustrated in Fig. 5, my improved device may be operated by a suitable electric motor as 20. The motor derives its power from the storage battery 21 normally carried by automobiles, busses and taxicabs, and which is preferably controlled by a suitable switch as 22, operated by the flag 23 of the taximeter 15. It will be understood that when the flag 23 is down, that is, when the vehicle is hired, the motor 20 is energized and the display device is set into operation. Said device, therefore, is operated automatically when the passenger compartment 13 is occupied, since the driver must lower the flag when the vehicle is hired. This results in a considerable saving of power and minimizes the drain upon the battery 21, the device when used for example, for advertising, operating only when the cab is occupied by a passenger, whether the vehicle is in motion or not.

Further, by operating the advertising device by means of a switch controlled by the taximeter flag, the advertising device is operated during the so-called "waiting time" of the taxicab, that is, during the time that the vehicle is hired and occupied by a passenger, but not in motion, such as during traffic stops, etc. The stationary side of the switch 22 is grounded as by the lead 24, and one side of the battery is also grounded as by the lead 25. The other side of the battery is connected by the lead 26 to one terminal of the motor 20, while the other terminal of the motor is connected by the lead 27 to the stationary terminal of the switch 22. The movable side of the switch 22 may be carried by the shutter of the taximeter (Fig. 5), the shutter being connected to the flag and moved into position to close the switch 22 by any suitable means well known in the taximeter art, when the flag is down and the cab is hired.

A control switch as 28 may be interposed in the lead 27 for opening the circuit to the motor 20 should it be desired to do so, as for example, when the battery 21 is low or has given up a large part of the energy stored therein. It will be understood, however, that as shown in Fig. 4, in vehicles not supplied with taximeters, such as automobiles, busses and railway cars, or in store windows and the like, the control switch 28 may be connected, as by the lead 29, directly to the motor terminal, and the taximeter switch 22 thereby eliminated, so that the device may be put into or out of operation by the driver or operator at will. It will further be understood that as illustrated in Fig. 2, the operation of the device may be removed from the control of the driver and be made dependent upon the taximeter 15 alone, in which case the switch 28 is eliminated and the lead 27 is connected directly to the stationary side of the switch 22.

Should it be desired, however, to operate the device from the power unit of the bus, automobile or taxicab, then a suitable transmission coupling 30, (Fig. 3) of any well known type, provided with a flexible shaft enclosed in the housing 31, may be engaged with, and obtain power from, the transmission 32. Such transmission coupling 30 being well known in the art, as for example, for use in driving speedometers and taximeters, further illustration and description thereof is deemed unnecessary. It need merely be said that the flexible shaft in the housing 31 is suitably connected to the plate operating mechanism in any suitable manner as by securing the worm 33 to the end thereof.

Where the transmission coupling 30 and the flexible shaft connection to the advertising device 17 is used, it will be understood that said device is operated when the vehicle is in motion, or only when the engine is running, depending on where the connection is made, and that the flexible shaft may also be connected to any moving part other than the transmission if desired, such as the fan shaft, generator shaft, or other accessible moving part.

I desire it to be understood that in the operating unit of my improved device, as shown in Figs. 6 to 14 inclusive, I prefer to provide a suitable frame 40 completely open at the front and back, and of substantially rectangular outline, and provided with suitable perforations, threaded openings, bearings, and the like, by means of which the various parts may be supported for proper operation. Arranged longitudinally of the frame between the top and bottom walls thereof, and preferably horizontally therein, is the plate supporting member 41, provided with a longitudinal groove as 42 for the reception of the lower edges of at least two sets 46 and 47 of longitudinally aligned plates 43 each carrying an advertisement or other indicia.

Each of said plates 43 is preferably formed of a single thin sheet of preferably light metal, celluloid, or other suitable material adapted to resist wear and handling, and which, while being rigid to some extent, has a certain amount of inherent resiliency or spring. Each of the plates is preferably thickened at its upper edge portion 44 as by folding said portion back on the remainder of the plate, to form a reinforced edge capable of resisting wear, the lower edge portion 45 of the plate being similarly folded for the same purpose.

It will be seen that a recess or guarded space as 37 is thus provided between the adjacent edges of the folded or thickened edge portions 44 and 45 of the plates, into which recess and on the front face 38 of the plate, may be secured, as by adhesive material or suitable fastening members, a sheet as 39 carrying advertising matter. It will further be seen that the sheet 39 being set into the recess 37 is protected at all times from any rubbing action due to the sliding of the thickened portions of the plates on each other as will be later described. The sheet 39 may, however, be entirely dispensed with and the indicia or advertising matter may be lithographed, printed or otherwise impressed directly on the plate as may be found convenient or desirable.

As has been indicated, the plates are arranged preferably in two sets, designated respectively (Fig. 10) by the numerals 46 and 47. The lower edges of said plates are slidably maintained at all times on the plate support 41 by the insertion thereof into the groove 42, while the upper edges of the plate are confined in the groove 36 formed between the depending side plates 48, secured to the upper wall 49 of the frame as by means of suitable bolts 50, as in Figs. 7, 12, and 13.

In Fig. 6, however, a single plate 48 is used, which cooperates with the integral rib or flange 35 of the frame wall 49 to form the groove 36. The width of the grooves 36 and 42 is sufficient for the reception of the predetermined maximum number of plates in the sets 46 and 47 under slight compression.

It will be seen that the plate support 41 divides the frame 40 into a plate-receiving compartment 52, and a mechanism compartment 53, in which latter compartment the major part of the mechanism for operating the device is arranged, and that the frame and the parts carried thereby constitute an operating unit adapted to be handled as a unitary assembly.

As shown in Fig. 6, a casing 120 is provided which is open at the front and which is set into the recess 18 of the vehicle wall. The casing conceals the operating mechanism and supports the operating unit. Said casing may be suitably secured to the walls of the recess in any suitable manner as by means of bolts, screws or the like, since it need not be removed. Formed on the lower front edge of the casing is an inwardly directed hook member 121, the free edge of which is in spaced relation to the bottom wall of the casing to permit the passage under the hook member, in either direction, of the projecting front edge 122 of the bottom wall of the frame 40 in a manner later to be described.

For normally closing the front of the casing 120, a door 123 is provided, the hinge 124 pivotally supporting the lower edge of the door. The upper edge 125 of the door is normally locked to the remainder of the casing by the lock 126, the bolt 127 of which engages the rear face of the lug 128, projecting downwardly from the top of the casing.

The door is provided with an opening for the reception of the transparent panel 129, which exposes the indicia of the plates 43 to view. Said panel is preferably made of glass and is suitably supported for quick removal from the door when it becomes necessary, and at an angle to the vertical.

It will be noted from Figs. 6 and 7 that the lower edge of the panel is quite close to the plates while the upper edge is spaced somewhat forwardly of the plates to permit the light from the lamp 130 to reach the plates. The angular disposition of the panel further serves to prevent double reflection to the eye of the observer and therefore permits clear and easy reading of the matter on the plates, as well as having the further advantages of eliminating glare and tending to prevent the casting of shadows on the plate.

In order to prevent the operating unit from rattling or vibrating within the casing, while at the same time permitting the quick and easy removal of the unit, when necessary, I provide one or more spring latches as 131. At its inner end, the latch is suitably secured to the casing (Fig. 8) as by means of the rivet 132 passing through a projection 133 of the casing. Intermediate its ends, the latch is provided with a substantially upright portion 134 adapted to engage the front edge of the top wall of the frame, said upright portion terminating in a curved resilient portion 135, the forward end of which is normally pressed upwardly against the stop 136 whereby the upright portion 134 is brought into firm contact with the frame and prevents the operating unit from moving relatively to the casing until the spring latch is disengaged.

To remove the operating unit, the lock 126 is first unlocked and the door 123 swung open about the hinge 124. The latch 131 is now free to be depressed and the forward end of said latch is then depressed to remove the upright portion 134 from its engagement with the frame. The frame may now be rotated in a counter-clockwise direction about the hook member 121, thereby carrying the top part of the unit out of the casing and causing the edge projection 122 of the frame to pass out rearwardly from underneath the hook member and permitting the entire unit to be removed from the casing. It will be seen, therefore, that in the construction just described, not only is the entire unit adapted to be handled as a single member, but the unit may be quickly and easily removed and re-inserted when necessary as for repair or replacement.

In the modified form of my invention shown in Fig. 7, the rear wall of the casing is made identical with the front wall thereof, being provided with a door 123, a lock 126, lamps 130, and a glass panel 129. In this form of my improved device, the rear plates of both sets 46 and 47 are visible as well as the front plates of the sets, whereby this form is particularly suitable for use in places where the device may be viewed from both sides as for example, where the device is to be arranged in a trolley car in which the passengers face both ways, in any entrance halls or the like wherein one side is visible by persons entering and on the other side, by persons leaving.

Figure 13:
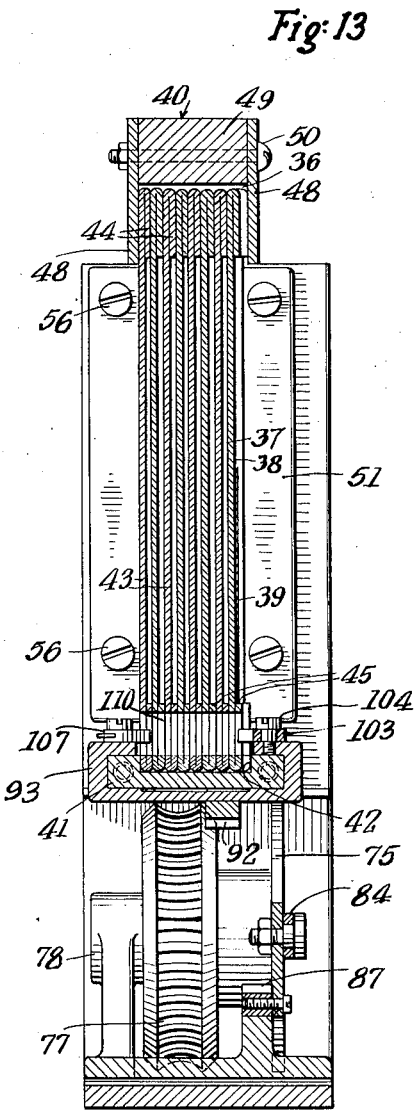
Fig. 13 is a similar section of the same, taken on the line 13—13 of Fig. 9.

As shown in Figs. 12 and 13, the casing 120 and the door 123 may be replaced by the outer frame member 54, which may be as ornamental as may be found desirable, and which carries the transparent panel 55, through which the front advertising plate of each of the sets 46 and 47 are visible. Suitable means may be provided for removably securing the outer frame 54 and the operating unit to the partition 16, such as for example, screws, bolts or the like.

As best shown in Fig. 9, the motor 20 is preferably arranged at one end of the frame 40, being mounted on the upright partition 60 as by means of suitable bolts 61. The motor serves to operate the mechanism for transferring the plates from one set to the other. On one stroke of the transfer or operating mechanism, the front plate of the set 46 is moved horizontally across the frame to a position in front of the set 47, whereby the plate originally exposed at the front of the set 47 is covered by the transferred plate, and a new plate initially behind the transferred plate becomes exposed to view at the front of the set 46. On the return stroke of the mechanism, the rear plate of the set 47 is transferred across the device to the rear of the set 46.

It will be understood that by the provision of the thickened edges or folds 44 and 45 of the plates, the area of possible friction between the plates is substantially reduced and that owing to the inherent resiliency of the plates, it becomes possible to eliminate springs or other operating mechanism for moving the plates of the set 46 forwardly toward the front of the device, or rearwardly in the set 47. However, a simple arrangement of pawls serves to maintain each of the sets of plates in the proper condition for further advance of the selected outer plate in each set.

For this purpose, I prefer to provide the spring-pressed pawls 62, 63, 64 and 65, arranged between the inner adjacent ends of the sets of plates. Each of the pawls is pivotally mounted near one end thereof, as by means of a suitable screw 66, and is spring-pressed toward its outermost position by means of a suitable spring, such as 67 or 68. The spring 67 as well as the pawls 62 and 63 are each mounted on a preferably U-shaped lower stop member 69 best seen in Figs. 9, 10 and 12.

The web of the member 69 is secured to the plate support 41 by means of the screws 66 and 70. The upright flanges thereof serve respectively as stops for the adjacent inner ends of the series of the plates 46 and 47. Similarly, the upper U-shaped member 71 is secured with the web thereof in contact with the lower face of the upper horizontal wall of the frame 40, the depending flanges thereof serving also as stops for the upper ends of the series of plates 46 and 47. As best shown in Fig. 12, however, the stop members 69 and 71 do not extend completely across the frame, but the ends thereof are spaced inwardly from the front surface of the frame and from the rear of the frame, respectively, a sufficient distance to permit the passage of a plate therepast and past the inner end of the pawl during the transfer of the plate from one series to another.

It will be seen that the front plate of the series 46, when first moved towards the series 47, engages the pawl 62, and swings said pawl in a counter-clockwise direction against the action of the spring 67. The moving plate thereby presses the inner ends of the plates of the set 47 rearwardly through the intermediary of the pawl, thus removing the inner end of the front plate of the set 47 from out of the path of the moving plate and clearing the groove 42 for the reception of the right hand end of the moving plate without interference by the plates of the set 47, the plates having sufficient inherent resiliency and being so arranged in the groove 42 to permit the action just described. After the outer end of the plate has passed the pawl, the spring 67 returns the pawl 62 into its initial position, wherein it is arranged, behind the end of the transferred plate, and thereby prevents retraction of said plate. Since the action of the pawls 63, 64 and 65 are similar to that just described, no furuther description thereof is deemed necessary..

In order, however, to insure that the left end of the transferred plate becomes arranged behind the pawl 62 and thereby adequately to prevent retraction of the transferred plate, I prefer to give said plate a movement greater in extent than that necessary merely to arrange it in the set 47 (Fig. 15). Toward this end, I provide a yieldable buffer plate 51 near each end of the frame. Said plate is slidably mounted on the stationary pins 56, preferably four in number and passing through the slots 57 (Fig. 16) of the plate. The buffer plate is urged into contact with the outer ends of the plates 43 by means of suitable springs 58. As the transferred plate reaches the extreme end of its movement toward the right (Fig. 15), and clears the pawl 62, it engages the buffer plate and moves said plate outwardly against the action of the springs 58, the pawl 62 thereby being freed for restoration to its initial position by the spring 67 and in said position, being arranged forwardly of the end of the transferred plate. Said plate now being released, springs 58 acting on the buffer plate move the transferred plate toward the left a sufficient distance to cause it to engage the pawl 62 and thereby to become aligned with the remainder of the plates in the set 47. The rear plate of the set 47 when transferred to the rear of the set 46, is similarly aligned under the action of the yieldable buffer plate at the other end of the frame. It will be seen that the slots 57 prevent the buffer plate from binding on the pins 56 even though the buffer plate may become arranged at an angle under the action of the transferred plate.

In Figs. 9 and 11, I have shown one form of the means for transferring the plates. Said means comprises a suitable connection from the motor 20 to the crank disc 75 for continuously rotating said disc.

As illustrated, the connection comprises a suitable worm 33 on the motor shaft, said worm engaging the worm wheel 77 loosely mounted on the stud shaft 76. Said stud shaft is suitably fixed to the bearing 78 and supports the crank disc 75 which is secured to the worm wheel 77 as by suitable pins 80. The stud shaft 76 may be provided with a head 81 set in a suitable recess 82 in the crank disc, so that the parts are properly held in position for rotation as a unit on the stud shaft.

Pivotally secured to the crank disc as by means of the bolt 83 at one end thereof, is the link 84 which is secured at the other end thereof as at 85, to the upstanding lug 86 projecting from the movable rack 87. Said rack slides on the upper face 88 of the rack support 89, and is arranged adjacent the bearing 90 projecting from the bottom wall 91 of the frame 40. The wall 91 in turn carries the various brackets and bearings for supporting the moving parts and may be removably secured to the frame 40 as shown in Fig. 9, or may be made integral therewith as in Fig. 6. A second rack 92, preferably parallel to the rack 87, and spaced vertically therefrom is secured to the under side of the carriage 93, which carriage supports the plate engagaing and moving devices, as will be later described.

The operative connection between the racks 87 and 92 consists of gear wheels designed to multiply the movement imparted to the rack 87, whereby the rack 92 moves at a greater speed than the rack 87. For this purpose, said rack 87 meshes with the gear 94 on the shaft 95, which is supported between the spaced bearings 90 and 96. The larger gear 97 on the shaft 95, in turn meshes with a smaller gear 98 on the shaft 99 supported in the same manner as the shaft 95. The shaft 99 carries also, the larger gear 100 which meshes with the depending teeth of the upper rack 92.

It will be seen that movement of the rack 87 in a given direction produces movement of the rack 92 in the same direction but at a greater speed and through a greater distance, whereby the carriage 93 is reciprocated the required distance to transfer the plates 43 on the rotation of the motor 20.

The carriage 93 embraces the plate support 41, being provided with spaced upper horizontal flanges 101 and 102 for that purpose, whereby the plate support serves as a guide and support for the carriage and for the upper rack 92. On the front upper flange 102 is arranged the spring-pressed pawl 103, pivoted to the flange at 104, and urged inwardly by the spring 105 against a stop pin 106, which limits the inward movement of the pawl. The pin 106 may, however, be dispensed with, and the inward movement of the pawl limited by a suitable shoulder on the pawl itself, adapted to engage a face of the plate to be transferred.

A similar pawl 107 is similarly mounted on the rear of the flange 101 of the carriage, but is spring-pressed by the spring 108 to operate in the opposite direction. The ends only of the pawls 103 and 107 are designed to enter a suitable opening 110 in the plate to be transferred. The stop pins 106, when used, or the pawl shoulders, are so arranged as to limit the inward movement of the pawls so that the respective ends of the pawls can pass only through the opening 110 in but one of the plates 43, whereby only one plate at a time can be engaged by the pawls, and the accidental transfer of more than one plate is prevented.

In operation, the motor 20 having been started, when the driver lowers the taximeter flag 23, or when the engine of the taxicab is started, or when the control switch 28 has been closed, as the case may be, the crank disc 75 is continuously rotated, thereby reciprocating the end 85 of the link 84 and reciprocating the rack 87.

In the position of the parts shown in Fig. 9, the carriage is about to start its return stroke to the left. Rotation of the crank disc 75 causes the rack 87 to move toward the left, thereby rotating the various gears 94, 97, 98 and 100 to forward the rack 92 and the carriage 93 to which it is secured toward the left. At this time, however, the rear plate of the series 47 is in such position that the end of the pawl 107 has entered the opening 110 of the plate. Movement of the carriage 93 now causes the pawl 107 to engage the left wall of the opening 110 of the rear plate, and to cause said pawl to move the rear plate to the left as the carriage moves. During the first part of the movement of said rear plate, the pawls 63 and 65 are engaged by the left end of the moving plate and swung inwardly against the action of their respective springs 67 and 68, thereby compressing the series of plates 46 and clearing the grooves 42 and 36 sufficiently for the reception of the lowermost and uppermost edges of the rear plate, respectively. Said rear plate is carried toward the left by the pawl 107, and during its movement applies forward pressure to the remaining plates of the set 46 to clear a space for its entrance therebehind.

During the last part of the movement of the carriage, the moving plate passes the left ends of the plates in the set 40 and engages and forces the buffer plate 51 toward the left against the action of the spring 58 until the right end of the moving plate has cleared and passed the ends of the pawls 63 and 65. Thereupon, said pawls swing outwardly and the springs 58 and the buffer plate 51 become effective to move the thus transferred rear plate slightly toward the right and into engagement with the pawls 63 and 65, and against the upright flanges of the U-shaped stops 69 and 71, whereby the transferred plate becomes fully aligned with the remainder of the set 46, ready to be moved forwardly under the pressure of the next plate transferred behind it, and to be forwarded to the set 47 when it reaches its most forwardly position.

On the return movement of the carriage, the pawl 103 enters the opening 110 of the front plate of the set 46, and carries said front plate toward the right, swinging the pawls 62 and 64 inwardly and being aligned in proper position by the yielding buffer plate 51 at the other end of the frame and said pawls 62 and 64 and the stops 69 and 71.

As shown in Fig. 14, a plurality of my new devices may be inter-connected in series or in tandem and operated by a single motor and a single set of gearing. In that case, the carriage 93 of one unit is connected to the corresponding carriage of the succeeding unit by means of a suitable link 109. Similarly, the carriages of the remaining units may be connected by similar links 109. Operation of the first carriage thereby causes operation of the succeeding carriages and causes transfer of the plates in unison in as many of the devices as are so inter-connected. It will be understood that the arrangement of such a plurality of devices is particularly suitable for use in street and railway cars, busses and the like wherein the amount of available space for advertising is much greater in other vehicles.

It will be understood that my improved device has other applications than those herein explained in detail, as will be obvious.

While I have shown and described certain specific embodiments of my invention, I do not wish to be understood as limiting myself thereto, since I desire to claim my invention as broadly as may be permitted by the state of the prior art and the scope of the appended claims.

I claim:

1. In a device of the character described, a first set of plates, a second similar set of plates, reinforced edge portions on said plates, a stationary channel-shaped stop of less height than that of said reinforced portions arranged between and engaging the adjacent ends of said sets of plates, means for transferring a plate from one set to the other including rack and gear means for moving said plate past said other set, and yieldable stop means including a slotted plate adjacent the remote ends of each set for urging said sets toward each other and against the stop for aligning the plates.

2. In a device of the character described, a grooved support for a complete set of plates, plate shifting means, and plate aligning means including a yieldable slotted buffer plate member of substantially the height of said plates arranged laterally across the groove and adjacent each end of the support, stationary stop means on and intermediate the ends of the support and adapted to engage the inner ends of the plates, and a spring-pressed pawl on the support adjacent the stop means and adapted to yield to permit the passage of a plate therepast in one direction and preventing retraction of the plate after it has passed the pawl.

3. In a changeable display device provided with movable plates, means for supporting the plates, rack and gear means for moving the plates horizontally on the supporting means, and means for aligning the plates laterally comprising a stationary channel-shaped stop member of less than one-quarter of the height of the plates, a yieldable one-piece plate engaging the major parts of the outer ends of the plates for urging the inner ends of the plates against the stop member, and spring-pressed pawls interposed in the path of a transferred plate and adapted to compress the remaining plates during the movement of the transferred plate thereby.

4. In a device of the character described, a substantially rectangular frame, a pair of similar sets of similar plates arranged within the frame, a horizontal member carried by the frame and provided with a longitudinal groove in which the lower edges of said plates are slidably mounted, said member dividing the frame into a plate compartment and a mechanism compartment, plate operating mechanism in the latter compartment including a carriage embracing the member, a rack on the carriage, means for reciprocating the carriage including a second rack, gearing operatively connecting the racks to move the carriage rack at a greater speed than that of the second rack, means on the carriage to move a plate from one set to the other, and yieldable means for laterally aligning the plates.

5. In a device of the character described, a multiplicity of plates disposed in aligned sets, and means for transferring a plate from one set to an adjacent set and for returning a plate of said adjacent set to the former set successively including a carriage, a rack on said carriage, a second rack, and means in constant operative engagement with and operatively connecting said racks to drive the racks at different speeds.

6. In a device of the character described, a set of similar plates, a movable first rack, means for operatively connecting the first rack to one of the plates, a second movable rack parallel to the first rack, and means operatively connecting said racks at all times to move the first rack a distance greater than the length of a plate on the movement of the second rack a lesser distance in either direction.

7. In a device of the character described, a set of plates, a stationary support for the plates having a longitudinal groove into which the edges of the plates are inserted, and having a pair of spaced upstanding flanges bounding the groove, a carriage embracing the support and said flanges, a movable rack spaced from the carriage, gearing operatively connecting the rack to the carriage for moving the carriage at a greater speed than that of the rack on movement of the rack in any position of the rack, means on the carriage for engaging one of the plates to move the same, and yieldable means permitting the movement of a plate therepast by the carriage and preventing retraction of the plate when the entire plate has been moved therepast.

8. In a device of the character described, a set of plates, yieldable means for laterally aligning said plates, means for moving a plate away from said set including a carriage, a reciprocatory member, means for operatively connecting the carriage to a plate, and means operatively connecting the member to the carriage for moving the carriage at a greater speed than that of said member, and yieldable means operated by a moving plate to compress said plates laterally and movable by the moving plate out of the path of the moving plate, said yieldable means being interposed in the return path of the moving plate after the completion of the stroke of said moving plate.

9. In a device of the character described provided with similar plates, plate transferring means including a crank, a pair of racks, one of said racks being operated by the crank, and gearing between the racks, yieldable means for aligning the ends of the plates, and a spring-pressed pawl interposed in the path of a transferred plate and adapted to be operated thereby to compress the plates laterally and interposed in the return path of the transferred plate after said plate has passed the pawl.

10. In a device of the character described provided with a set of similar plates, yieldable means for aligning the ends of the plates including a slotted plate, stationary pins passing through the slots of the plate to guide and support the plate, and springs on the pins engaging and urging the plate inwardly along the pins, means for transferring a plate from said set, means for operatively connecting said transferring means to a movable part of a vehicle, and yieldable means operated by a plate moved by said transferring means to compress said set of plates laterally, and to prevent retraction of the transferred plate.

11. In a device of the character described, a casing, a door thereon, a display unit within the casing, including a frame, movable plates within the frame, and means for shifting a plate in the frame and means for removably connecting said unit to the casing comprising a hook member on the casing and a projection on the frame adapted to removably engage the hook member, whereby the unit may first be rotated out of the casing and then disengaged from the hook member.

12. In a device of the character described, a casing, a door thereon, an angularly disposed transparent panel on said door, a changeable display unit within the casing comprising a frame, plates mounted for movement within the frame, the lower edges of said plates being nearer the panel than are the upper edges of the plates and reciprocatory means for shifting said plates, and means for securing said unit in said casing against vibration therein and for quick detachment therefrom comprising a spring member arranged in the path of the door and adapted to engage the frame.

13. In a device of the character described, an annular frame, a horizontal member arranged intermediate the top and bottom walls of said frame, said member having a longitudinal groove therein, a first set of similar plates each of less than half the length of the member, each plate having an opening therein and arranged in the groove, a second set of similar plates arranged in the groove and in longitudinal spaced relation to the first set, a stop on the horizontal member having upright flanges engaging the adjacent lower ends of each set, a similar stop for the upper ends of the sets, a pair of similar plate-holding pawls spring-pressed in opposite directions and carried by and between the flanges of each of said stops and projecting normally transversely beyond the groove of the horizontal member, a carriage slidable on the horizontal member, a first rack secured to the carriage, a second reciprocatory rack parallel to and below the first rack, the teeth of said racks being directed toward each other, means operatively connecting said racks for moving the first rack in the same direction as the second rack but at a greater speed, a plate forwarding pawl on the carriage adapted to enter the opening in one of the plates, means for limiting the inward movement of the forwarding pawl, the moving plate when passing a holding pawl being adapted to compress a set of plates in the groove through the intermediary of said holding pawl and thereby to clear said groove for the reception of the moving plate, and a spring-pressed buffer member arranged at the extreme end of the path of the moving plate and adapted to yield under the pressure of the moving plate.

14. In a device of the character described, a frame, a horizontal grooved partition in the frame dividing the frame into a plate compartment and a mechanism compartment, a set of plates arranged with all of the lower edges thereof in the groove of the partition, means on the upper wall of the frame providing a groove for the reception of the upper edges of the plates, a short and low channel-shaped member on said upper wall and on said partition serving as a stop for the inner ends of said plates, yieldable means adapted to engage the outer ends of said plates for normally urging the plates against the stop means including a slotted buffer plate, stationary pins passing through the slots of the buffer plate, and springs on said pins, means including a carriage embracing and slidable on the partition for advancing a plate along the groove, means operated by the advancing plate for clearing the groove in advance of the moving plate, and rack and gear means in the mechanism compartment for reciprocating the plate advancing means.

15. In a device of the character described, a display unit comprising a frame, a plurality of horizontally aligned sets of plates within the frame, means for shifting said plates including a horizontally reciprocatory carriage, and means for connecting the carriage to the plates to shift a front plate from one set to the front of an adjacent set on one stroke and on the next stroke to shift a plate from the rear of said adjacent set to the rear of said one set, a second similar display unit arranged in longitudinal alignment with the first-mentioned unit and similarly including sets of horizontally aligned plates and a carriage, and a link for operatively connecting the reciprocatory carriages of said units together to shift the plates within the units simultaneously.

16. In a device of the character described, a display unit comprising a first set of substantially vertical plates, a second set of plates in horizontal alignment with the first set, a grooved support into the groove of which the lower edges of said plates are inserted, a carriage embracing the support, means on said carriage for shifting a plate from the first set to the second set and from the second set to the first set, a second display unit including a similar set of plates, a similar support, a similar carriage and similar shifting means, means for reciprocating one of said carriages, and means for operatively connecting the carriages to move both carriages on the operation of one of said carriages by said reciprocating means.

17. In a device of the character described, a display unit including a first set of plates, a second set of plates in horizontal alignment with the first set, reciprocatory means for shifting a plate from the first set to the second set on one stroke and from the second set to the first set on the next stroke, a similar display unit including similar plates and similar reciprocating means, and means for operatively connecting the reciprocatory means of both units to operate both of said reciprocatory means on the operation of one of said reciprocatory means.

18. In a device of the character described, a casing member, a display unit including a frame member, plates supported within the frame member, means within the frame member for shifting said plates, and means for detachably securing the unit to the casing member comprising separable interengaging elements on said members, adapted to permit the relative rotation of the unit and the casing while said elements remain in engagement.

19. In a device of the character described, a casing, a display unit within the casing comprising a series of substantially vertically arranged plates and means for shifting the plates, a door for the casing having an opening therein, the lower wall of said opening extending inwardly into the casing a distance greater than the upper wall of said opening extends in the same direction, and a transparent panel arranged in the opening at an acute angle to the plates.

20. In a device of the character described, a casing, a changeable display unit in the casing including shiftable plates, means for illuminating the plates, a door for the casing, and a transparent panel in the door arranged angularly to and adjacent the faces of the plates and thereby decreasing the shadows cast on said faces by the illuminating means.

21. In a device of the character described, a casing, a changeable display unit in the casing including shiftable plates, a frame for the unit, cooperating means on the frame and the casing for maintaining the unit in its operative position but permitting the rotation of said unit about said means at least partway out of the casing, a door for the casing, and a transparent panel in the door arranged at an acute angle to the plane of the face of the door to dispose one edge of said panel nearer the plates than the opposite edge.

22. In a device of the character described, a casing, a door therefor, a changeable display unit in the casing including shiftable plates, a frame for the unit, cooperating means on the frame and the casing for maintaining the unit in its operative position but permitting the rotation of said unit about said means, a shouldered spring member secured to the casing, and means on the door for forcing the shoulder of the spring member against the frame to secure the unit against vibration in the casing when the door is closed.

23. In a device of the character described, a casing, a door therefor, a changeable display unit in the casing including shiftable plates, a frame for the unit, cooperating means on the frame and the casing for maintaining the unit in its operative position but permitting the rotation of said unit about said means, a transparent panel in the door arranged at an acute angle to the plane of the face of the door and a frame holding member on the casing adapted to be forced into pressed engagement with the frame on the closing of the door to hold the unit against vibration in the casing.

24. In a device of the character described, a multiplicity of plates arranged in aligned sets, a grooved support into the groove of which the lower edge of the plates are slidably mounted, a member providing a groove for the slidable reception of the upper edges of the plates, means for transferring a plate from one set to an adjacent set and for returning a plate of said adjacent set to the former set successively including a carriage embracing the lower support, a rack on the under side of the carriage, a second shorter rack below the carriage and parallel to the carriage rack, and a set of gear wheels interposed between the racks, one of said gear wheels being in constant engagement with the shorter rack and another being in constant engagement with the carriage rack whereby any movement of the shorter rack is imparted to the carriage.

25. In a device of the character described, a multiplicity of plates arranged in horizontally aligned sets, reciprocatory means for transferring a plate from one set to the other, a buffer plate having openings therein, each extending horizontally to an edge of the buffer plate, said buffer plate being arranged at an end of a set, pins passing through the openings and supporting the buffer plate, and springs on said pins urging the buffer plate against the ends of the adjacent aligned plates, said buffer plate yielding on the movement of a transferred plate past the final position of the transferred plate and temporarily assuming an inclined position on the pins but being prevented from binding on the pins by said extended openings.

NATHAN A. KARLIN.